US006139034A

United States Patent [19]

Williams

[11] Patent Number: 6,139,034

[45] Date of Patent: Oct. 31, 2000

[54] FOOD SERVICE CART

[76] Inventor: William Williams, 26 Riverhill Dr., Stamford, Conn. 06902

[21] Appl. No.: 09/170,483

[22] Filed: Oct. 13, 1998

[51] Int. Cl.[7] .......... B62B 3/00

[52] U.S. Cl. .......... 280/47.35; 280/79.2; 312/218; 292/189

[58] Field of Search .......... 280/79.2, 47.35; 312/218, 217; 292/162, 189, 148

[56] References Cited

U.S. PATENT DOCUMENTS

| | | | |
|---|---|---|---|
| 854,193 | 5/1907 | Betts | 292/189 |
| 1,355,371 | 10/1920 | Welsh | 292/189 |
| 3,010,775 | 11/1961 | Giovannelli | 312/217 |
| 4,095,828 | 6/1978 | East | 292/148 |
| 4,452,371 | 6/1984 | Jurek | 220/315 |
| 4,886,286 | 12/1989 | Whorton, III | 280/47.35 |

*Primary Examiner*—Eric Culbreth
*Assistant Examiner*—James S. McClellan
*Attorney, Agent, or Firm*—Joseph M. Fowler

[57] ABSTRACT

A food service cart for airplanes is provided with a vertically slidable latching mechanism for it doors. The latching mechanism may be secured by a padlock and the upper handle of the latch forms a protective hasp to prevent thievery of stored goods. The handle of the latch is located in an ergonomically advantageous position.

15 Claims, 6 Drawing Sheets

FIG.4
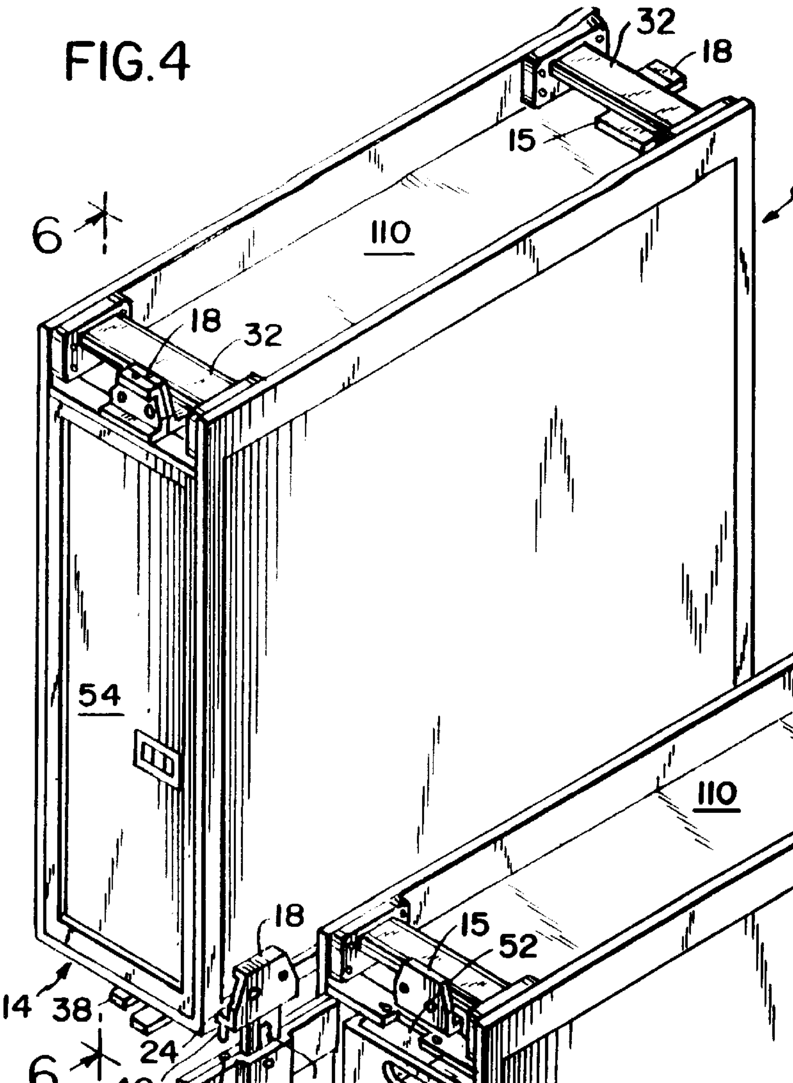
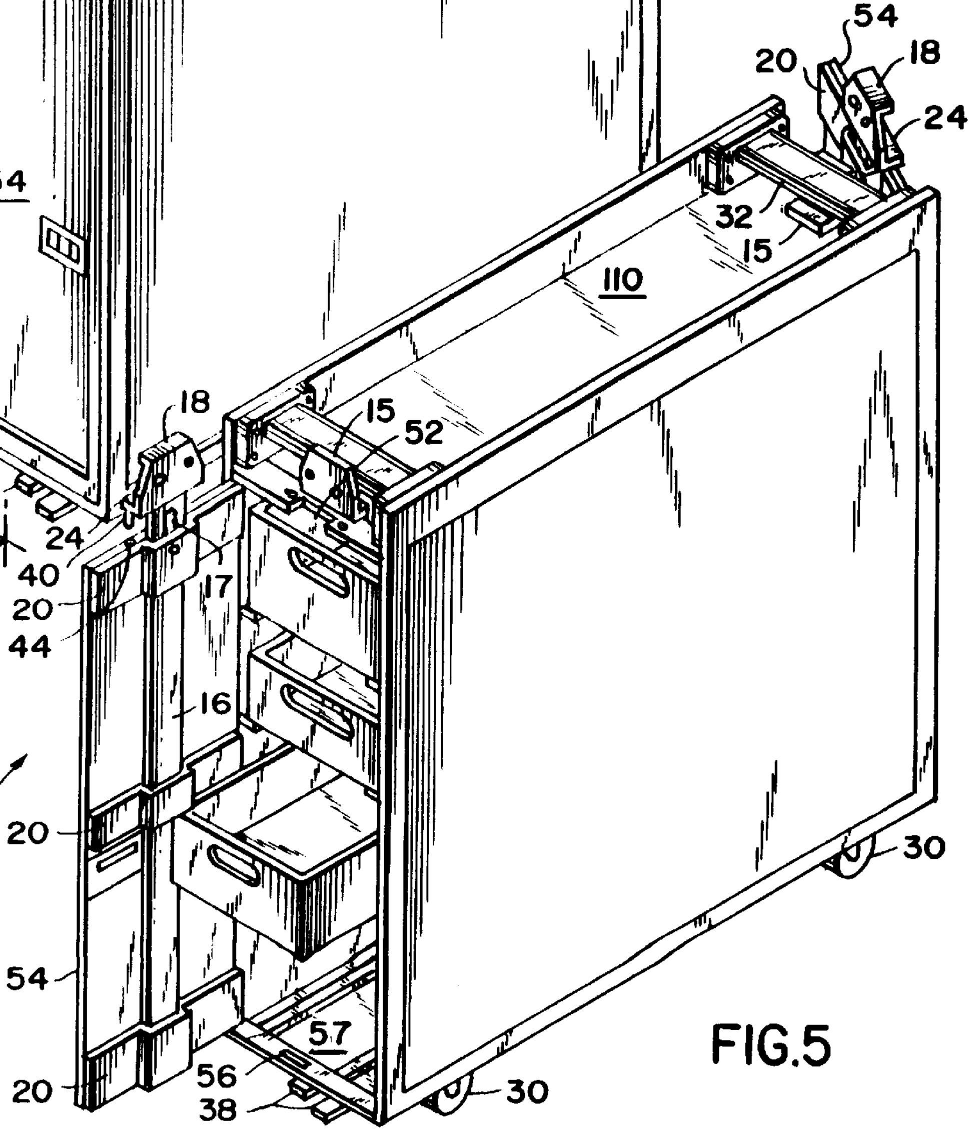
FIG.5

FIG.6
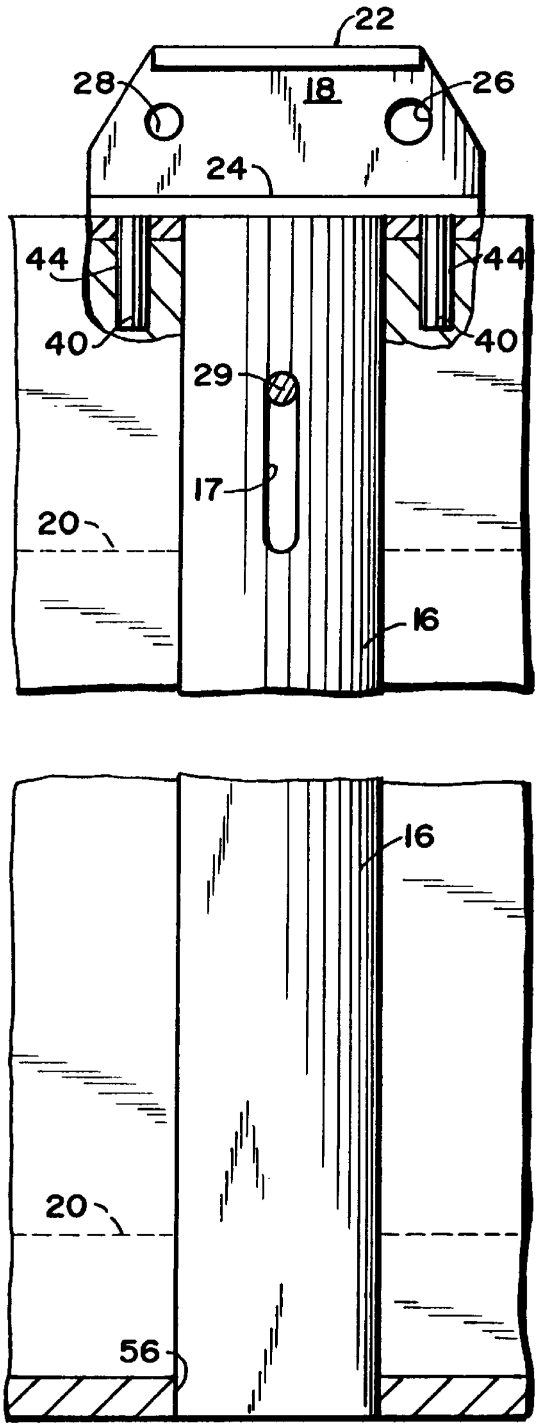
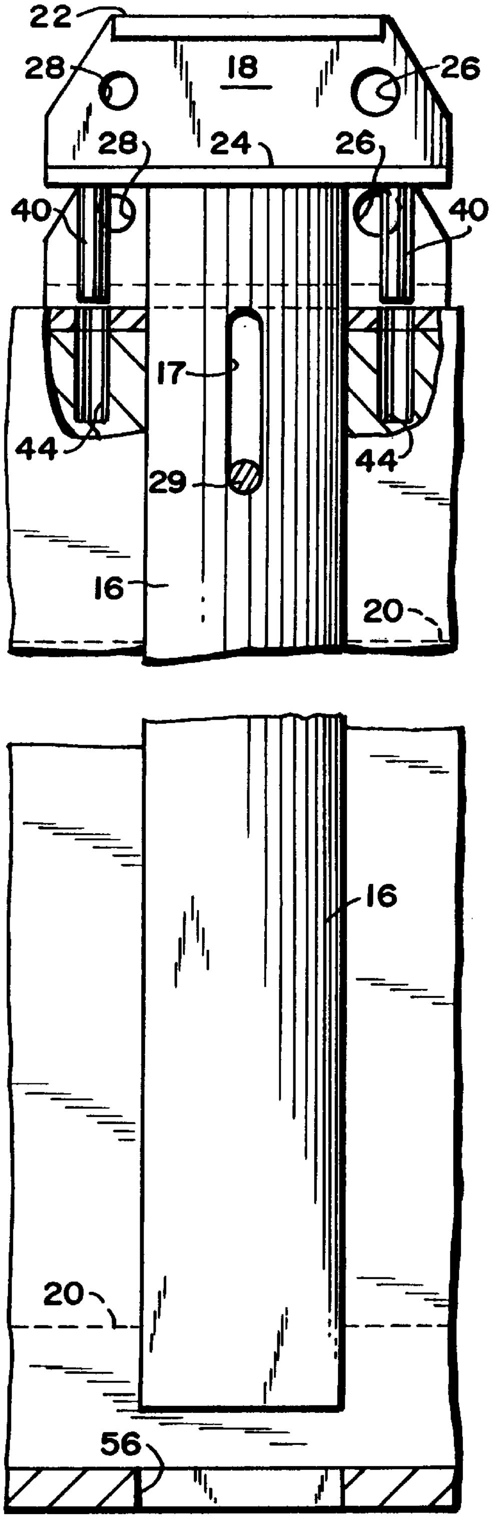
FIG.7

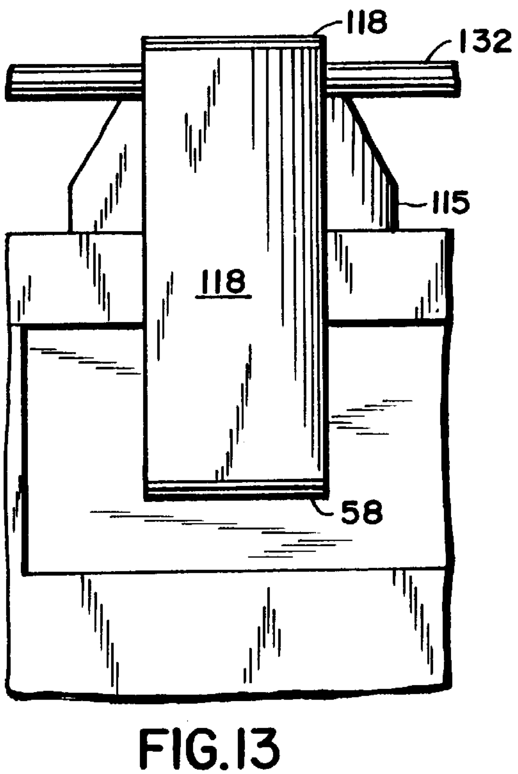
FIG.13
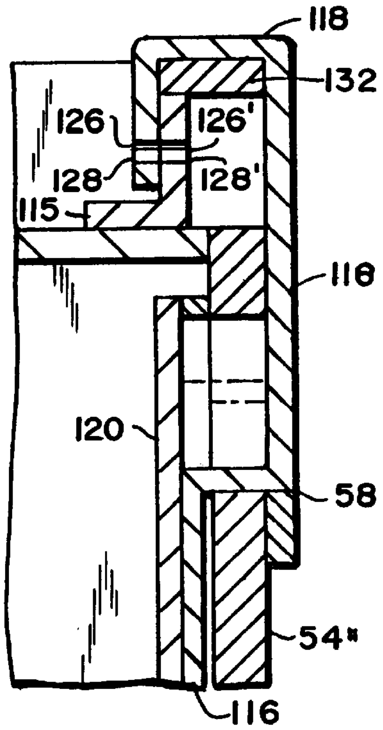
FIG.14
FIG.15
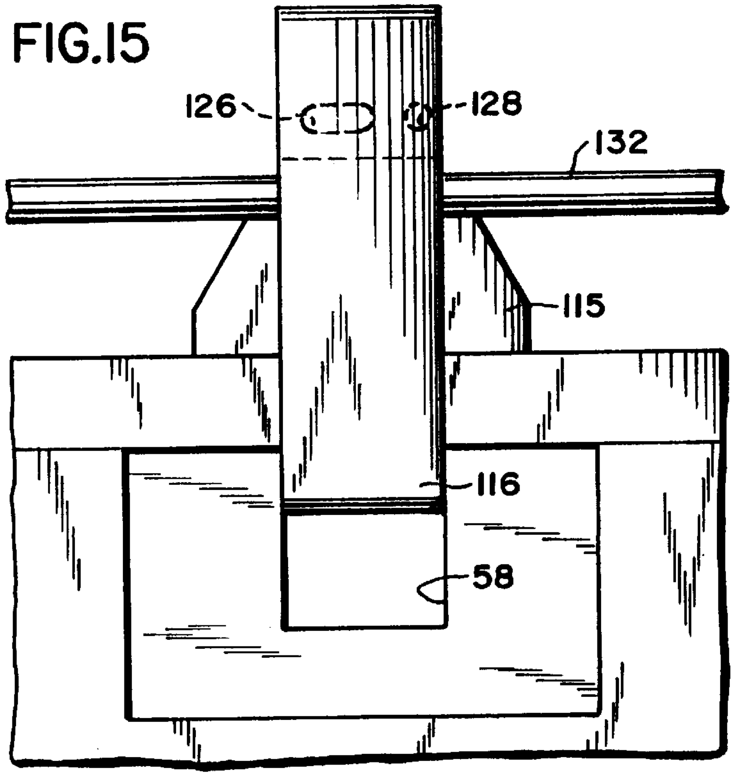

FOOD SERVICE CART

FIELD OF THE INVENTION

This invention relates to food service carts for airplanes and, more particularly, to an improved latching and locking mechanism for doors on such carts.

BACKGROUND OF THE INVENTION

Food service carts in airplanes arc often used to store liquor and other valuable items. In some instances, expensive cameras, watches and jewelry are stored for duty free sale during international flights. Theft of items locked away in food service carts is not uncommon and results in substantial monetary loss to vendors of these products.

Of greater potential consequence is the ease with which even padlocked carts can be broken into which raises serious concerns for security personnel and for the public at large. It is all too conceivable that weapons, bombs or terrorist contraband could be smuggled aboard an airplane in a food service cart.

Another concern is that the serving attendant must bend down repeatedly to retrieve trays or to replace trays when food is being served. When an airplane flies through stretches of turbulent or "bumpy" air, the service attendant may find it necessary to open and close a door on the service cart many times in a single tour through the aisles of the vehicle. A more ergonomically considered door latch would lessen the bending required of service attendants and thereby reduce fatigue and the possible occurrence of repetitive stress injuries.

Conventional food service carts for airplanes generally have slidable door latches located at a point midway along the vertical height of the doors. A latch is recessed into each door and can be slid horizontally into a catch located in the side frame of the cart.

In addition, a hasp and staple are usually provided which enables the cart doors to be padlocked. The staple is attached to the door frame or to an extension of a food tray support rail. When the door is closed the staple protrudes through the hasp which is located approximately one third of the way down the vertical height of the door. The hole in the staple is designed to accept the shackle of a small padlock. The hasp is recessed so that the staple and padlock will not project beyond the front of the cart. This reduces the likelihood that passers-by or their clothing will become ensnared by either the staple or padlock. Neither the shackle of the padlock nor the metal of the staple is particularly thick in cross-section as a consequence of the need for compactness and the concern for saving weight characteristic of equipment used aboard aircraft. In cases reported by airline carriers and by vendors of goods which were lost due to thievery, the sheet metal staple was cut and bent away enabling the removal of the small padlock. In some instances the goods were removed and the padlock was returned to its original position. Then the metal staple was bent back into place which disguised evidence of intrusion and delayed discovery of the theft.

Many devices exist to improve the effectiveness of door latching mechanisms including the development in a related art of more effective hasps for padlocks. An early British patent No. 6113 (1911) to Vaughan shows angle plates mounted on a window sash which act as hasps for a padlock. Each angle plate is hinged to a mounting plate in a manner designed to cover up the mounting screws and thus hinder unauthorized removal of the hasp. A hasp may be regarded as any device used for mating doors, or a door and its accompanying structure, which has an aperture for the acceptance of the shackle of a padlock. Door hasps having offset matable plates, one mounted on the door edge and one mounted on the door jamb is taught by Clarke, U.S. Pat. No. 2,845,295 (1958).

In Nikola, U.S. Pat. No. 3,460,861 (1969), a pair of staples is shown in which one has a flange around part of the edge of its outwardly projecting side. The second staple, when held adjacent to the first staple, will fit snugly against it within the protective flange. This makes it more difficult to damage the shackle of a padlock holding the pair of staples together.

More recently, U.S. Pat. No. 4,745,783 (1988) to Poe discloses padlock hasps more resistant to tampering incorporating guard plates which limit access to the padlock shackle by common bolt cutters, hacksaws arid the like. Similarly, patents issued to Anderson, U.S. Pat. No. 4,949,560 (1990) and U.S. Pat. No. 4,961,329 (1990) present padlock hasps with protective mounting plates to suit a variety of common padlocks with different length shackles. In a patent issued to Wilson, U.S. Pat. No. 3,665,736 (1972), a locking bar is shown which can be extended to surround the front of a cabinet. At one location on the bar, adjacent flanges meet as hasps which can accept the shackle of a padlock and thereby prevent unauthorized access to a vending machine. The Wilson device is intended to act as a second high security lock for a cabinet which is opened infrequently. In design and massiveness it differs markedly from the instant invention which requires compactness and ease of entry.

While many devices in this related art exist to protect padlock shackles and cabinet entry, none is particularly appropriate for use on food service carts in airplanes where quick and frequent access to the storage compartment is required.

BRIEF SUMMARY OF THE INVENTION

The instant invention comprises an improved latching and locking mechanism for food service carts used on airplanes. The cart incorporating the invention contains a slidable door latch in which the slidable member is both a latch engaging the frame of the cart and a protected hasp designed to accept the shackle of a padlock. The slidable latch is vertically mounted within a channel located on the door panel. The top end of the slidable member is bent forming a flange which can be used as a handle and also serves as a protected hasp for a padlock. When the door is latched, the slidable member engages a catch or opening located in the floor of the cart below the door and simultaneously engages the top of the door as a second catch. In another embodiment, the slidable member engages a floor catch and simultaneously encloses a grab handle located on top of the cart.

The handle end of the vertically slidable latch is located above the top of the door, about waist high, in contrast to the relatively low position of the horizontally slidable latch in a conventional food service cart. Thus service personnel can easily unlatch the door using the invention without having to bend from the waist. Accordingly, a rain object of the invention is to provide an improved door latching mechanism for service carts used on board airplanes.

Another object of the present invention is provide a door latching mechanism for food storage carts which is easier to use by providing ergonomically advantageous placement of the latch handle.

A further object is provide a more robust locking mechanism for a food service cart for an airplane which will inhibit entry by unauthorized personnel.

Yet another object is to provide a door latching and locking mechanism for a food service cart which combines a slidable latch, a receiving means for the slidable latch, and a protected hasp to accommodate a padlock.

These objects together with other objects and advantages of the invention will become clear with reference to the following detailed description supplementally illustrated by the accompanying drawings.

BRIEF DESCRIPTION OF THE DRAWINGS

FIG. 4 is a perspective view of a food service cart incorporating one embodiment of the present invention;

FIG. 5 is similar to FIG. 4 however the cart is shown with its doors open;

FIG. 6 is a section view of the slidable latch mechanism of the present invention taken along the lines 6—6 of FIG. 4 and it is shown with the latch in a lowered position;

FIG. 7 is similar to FIG. 6, however, the slidable latch is shown in a raised, unlatched position;

FIG. 13 is an enlarged front view of the upper portion of the invention shown in FIG. 12 and the latch is shown in a lowered position.

FIG. 14 is a side cross section of FIG. 13.

FIG. 15 is similar to FIG. 13 however the slidable member is shown in a raised, unlatched position.

DETAILED DESCRIPTION OF THE INVENTION

Figure 1:
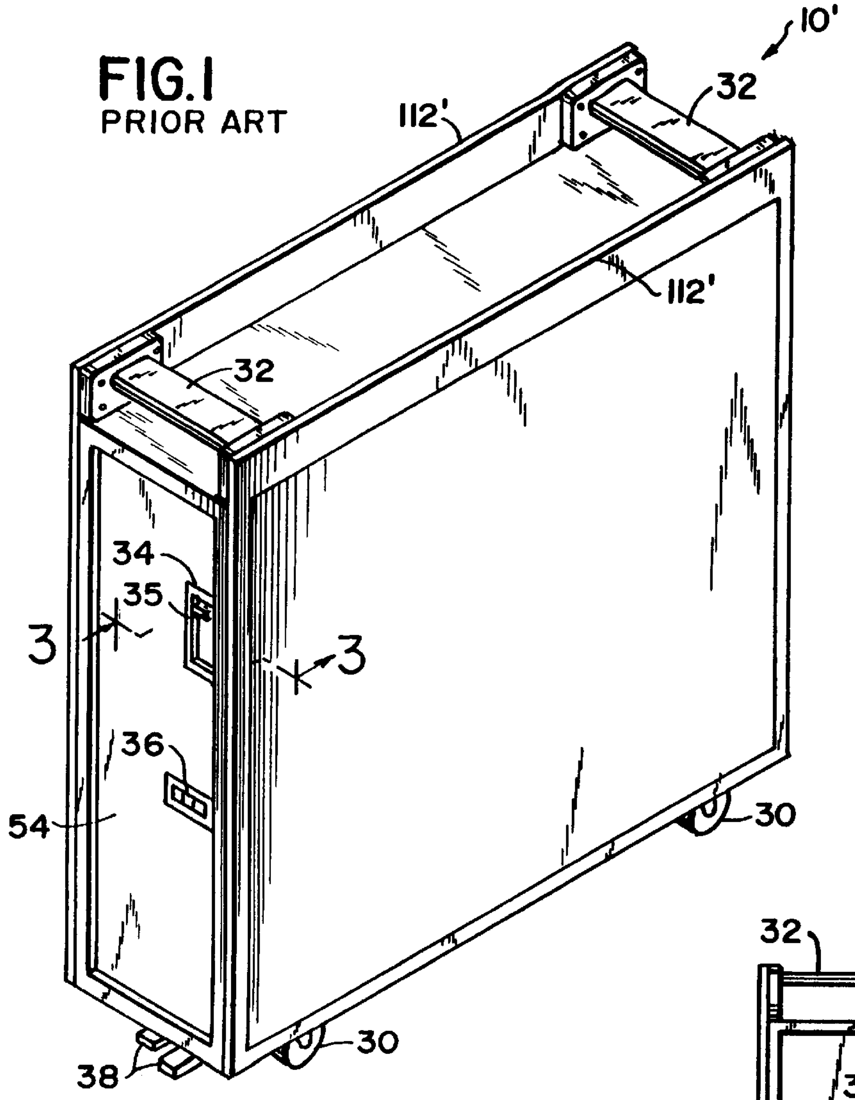
FIG. 1 PRIOR ART
FIG. 1 is a perspective view of a conventional, prior art food service cart.
Figure 2:
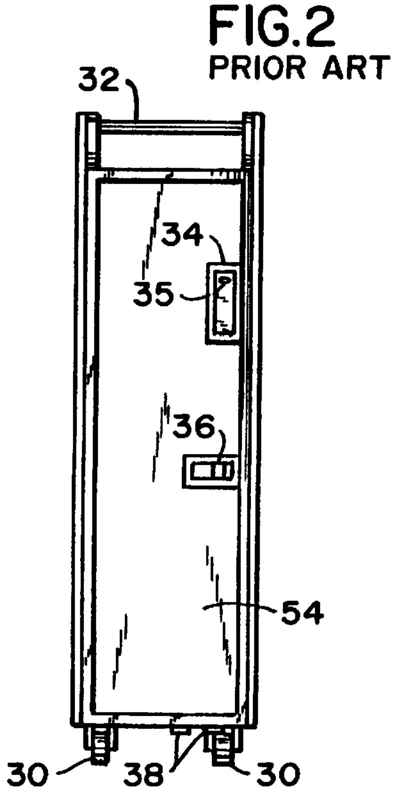
FIG. 2 PRIOR ART
FIG. 2 is a front view of a conventional food service cart.
Figure 3:
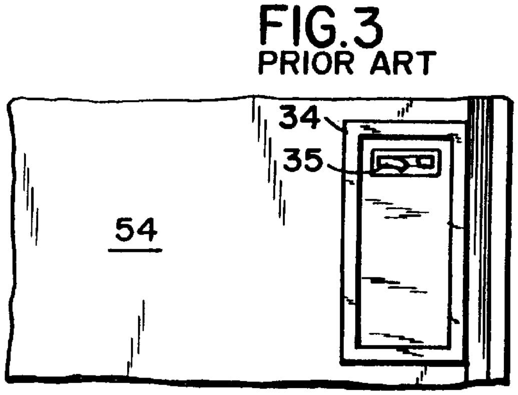
FIG. 3 PRIOR ART
FIG. 3 is an enlarged view of the front of the cart taken along the lines 3—3 of FIG. 1 showing the staple and recessed hasp of a conventional cart.

Referring now to the drawings, and more specifically to FIG. 1, a food service cart is shown of the conventional, prior art design used by most airlines. The cart, generally designated by the numeral 10', comprises a six-sided cabinet having two doors 54, one front and one rear (not visible in FIG. 1), which enable access to the interior of the cabinet from either end. The cart measures approximately 32½" (85 cm) from front to back, 12" (30.2 cm) wide and 38" (85.8 cm) high. Casters 30 are located below each corner of the cabinet adjacent to a brake mechanism (not shown) which is capable of fixing cart movement. Brake pedals 38 for engaging and disengaging the brake mechanism are visible in FIGS. 1 and 2. Grab handles 32, in the form of cross members connecting the side frames 112' of the cart, are mounted on top and are used for pushing and pulling; one handle is located near each end. A horizontally slidable latch 36 is provided for locking the cart door 54 and is located about half way down the height of each door. A recessed hasp 34 arid staple 35 are also provided for padlocking the cart. In FIG. 3 of the drawings, the staple 35 is shown cut and bent away and the padlock has been removed.

A preferred embodiment of the food storage cart incorporating the present invention is shown in FIGS. 4–10 of the drawings. In FIG. 4, a cart contains as part of the invention a vertically slidable latch referred to generally by the numeral 14.

Figure 9:
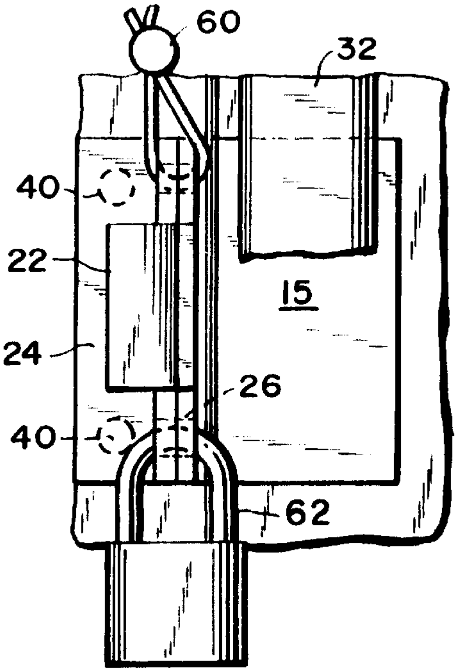
FIG. 9 is a top view of the present invention taken along the lines 9—9 of FIG. 8.
Figure 10:
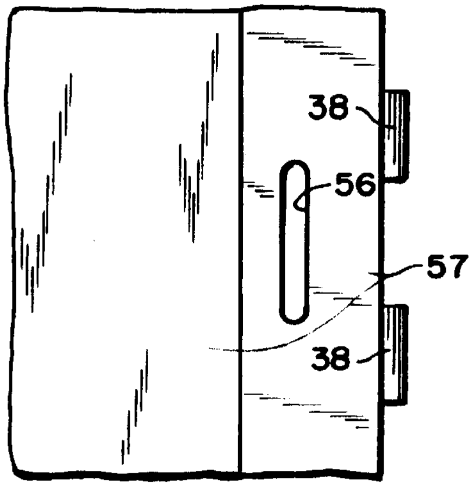
FIG. 10 is an interior view of the cart using the present invention looking down along the lines 10—10 of FIG. 8.

The latch 14 is comprised of a slidable body member 16 contained within channel-shaped guides 20. The slidable body member 16 is connected to a top handle 18. The handle is formed with top and bottom flanges designated by numerals 22 arid 24, respectively, which project forward from the web of the handle connecting the flanges. The web is co-planar with the slidable body member 16 and the flanges are perpendicular to that same member. The handle 18 acts as a hasp and contains at least one hole 26 which will accept the shackle of a padlock 62 as shown in FIG. 9. Another hole 28 may be used as an attachment location for a customs duty tag 60 which is often required when saleable goods are stored in a service cart on an airplane which crosses national boundaries.

With reference to FIGS. 5, 6 and 7, the bottom flange 24 of the handle 18 is fixably attached to downwardly projecting pins 40. The pins are spaced farther apart than the horizontal width of slidable member 16 in line with receiving holes 44. A notch 52 has been cut in the top 110 of the food service cart 10 to permit door 54 to close completely when slidable member 16 extends above the height of the door. Receiving holes 44 for pins 40 are located adjacent to and on either side of notch 52. Receiving holes 44 pass through the top 110 of the cart 10 into the door 54 such that a pair of holes, one in the top and one in the door, are co-linear.

When a door to the cart is closed and latched, the pins 40 are retained in the receiving holes 44 and the lower end of latching member 16 is retained in catch 56 located in the floor 57 of the cart below the door. In FIG. 5 and in the enlarged top view represented by FIG.10, catch 56 is shown adapted to the width of the vertical slide 16. Although catch 56 is shown as a slot in the floor 57, other means can be used to receive the slide 16 to achieve an effective latch. The vertical slide 16 is normally fabricated from sheet metal although it should be understood that other materials, and other shapes of material, may be used when it is more appropriate.

Figure 8:
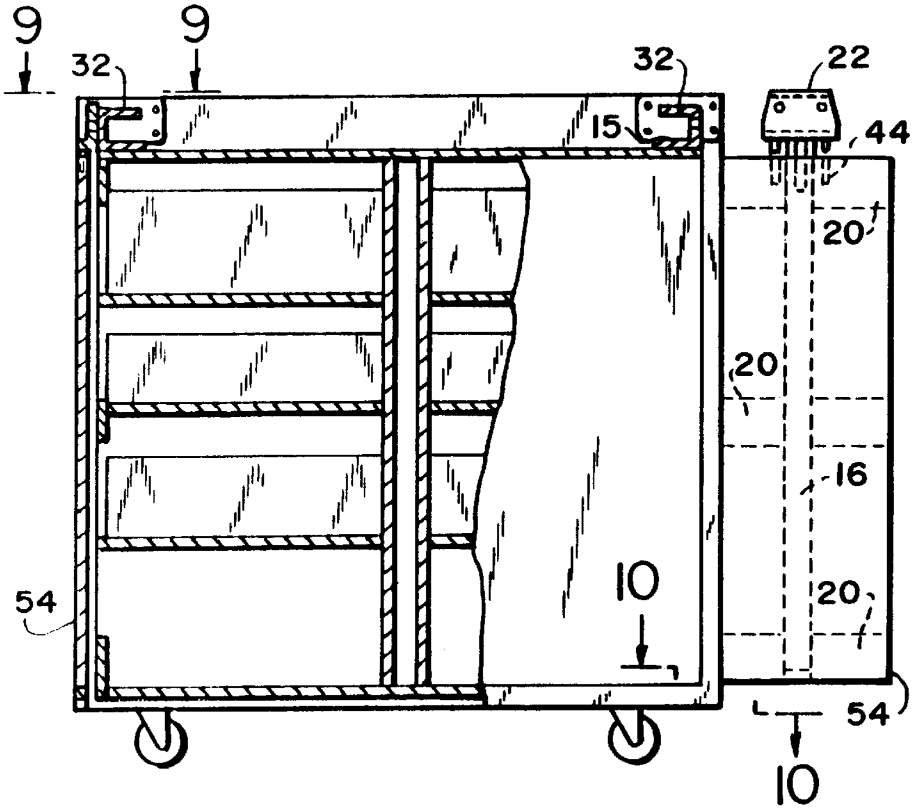
FIG. 8 is a side view of the present invention shown in cutaway to reveal the interior structure of the cart.

As shown in FIGS. 8 and 9, when the door is fully closed, top flange 22 of handle 18 is located close to the underside of grab handle 32. When slidable member 16 is slid into latched position the holes provided in handle 18 are aligned with holes provided in a hasp or mating flange 15. The hasp 15 is fixedly attached to the Lop of the cart immediately below and adjacent to the grab handle 32. Flange 22 of the handle projects forward and thus protects the juncture of handle 18 and hasp 15 which can be joined by a padlock. Furthermore, the location of this juncture is below grab handle 32 and thwarts would-be thieves by restricting access to the shackle of the padlock. The handle 18, comprising the channel with flanges 22 and 24, and the fixed hasp 15 are comprised of material that is much wider and thicker in cross section than the prior art staple 35, and are therefore much more resistant to tampering.

With reference to FIGS. 5, 6 and 7 of the drawings, the slidable member 16 contains a slot 17 which surrounds a travel stop 29. The travel stop 29 limits the upward movement of the slidable member 16 to the length of the slot below the travel stop 29 which is approximately 1½" (3.8 cm). The travel stop 29 comprises a fastener or pin which is fixed to the back panel of door 54. Stop 29 has a cross sectional diameter less than the width of slot 17 so that the slidable member can move up and down easily. The length of travel is sufficient to allow pins 40 to pass freely over the top of the cart thereby permitting door 54 to be fully closed against the cabinet.

Figures 11, 12:
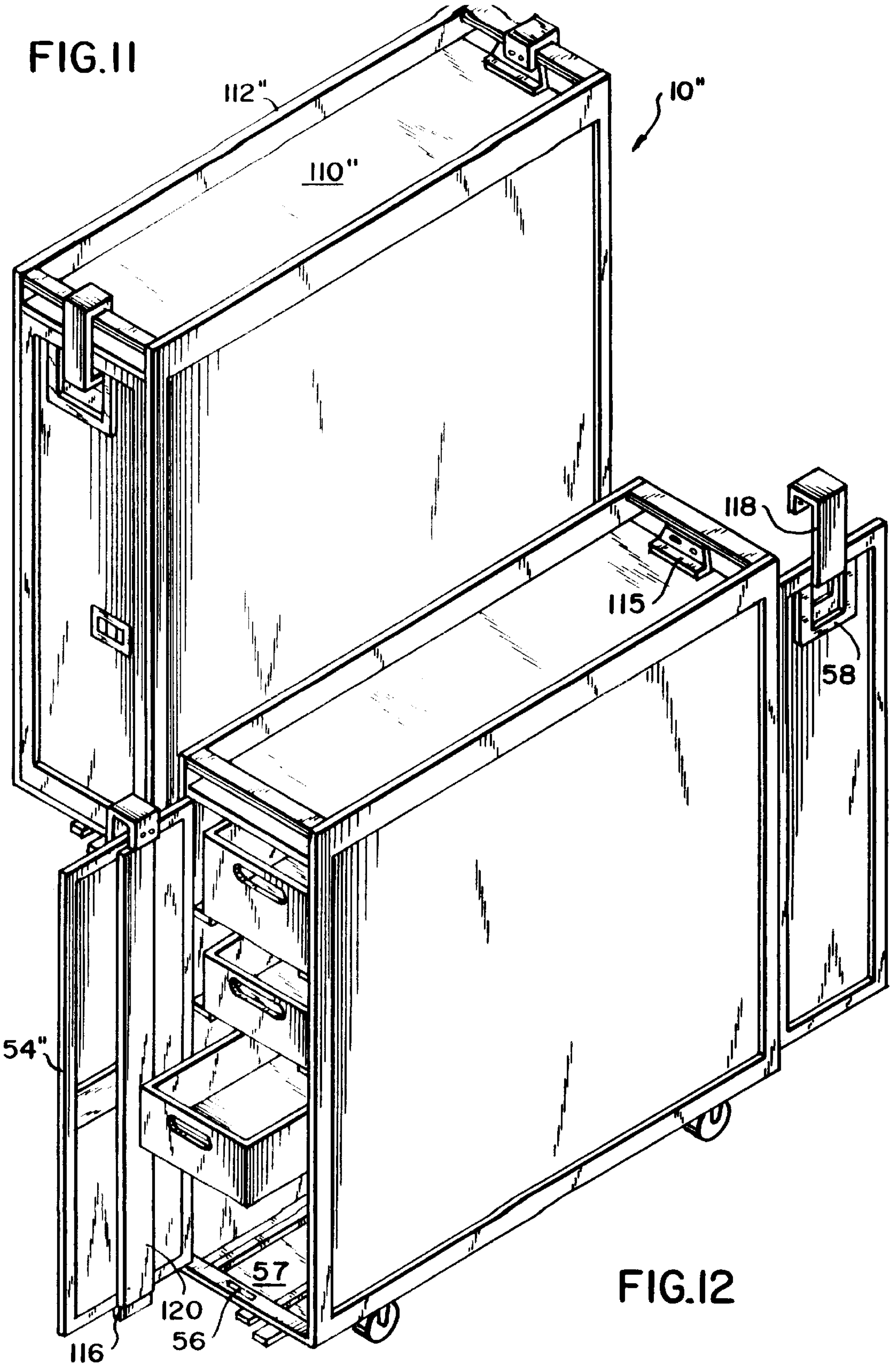
FIG. 11 is a perspective view of a food service cart incorporating a second embodiment of the invention.
FIG. 12 is similar to FIG. 11 however the cart is shown with its doors open.

In another preferred embodiment of the invention illustrated in FIGS. 11–15, a vertically slidable member 116 is contained within a guide channel 120 fastened to the back of the cart door 54". In FIG. 12, guide channel 120 is shown as a separate part attached to door 54". It should be understood however that the material from which the door panel is made may incorporate an equivalent channel as part of its mechanical structure and therefore a guide channel need not be a separately assembled component as shown in this drawing.

In FIG. 14, the handle 118 of the vertically slidable member 116, is laterally offset parallel and forward of the plane of the major portion of the body of slidable member 116 so that it can slide along the front surface of the door. The length of this forward offset is a function of the thickness of the door panel 54" and it should be understood that a vertically slidable member could be designed with little or no offset as long as the position of the grab handle is such that it could be fixably engaged when the slidable member is in a lowered position. In this example, an opening 58 has been created in the door panel permitting the handle to slide along the front surface of the door while the major portion of the boby of the vertical member slides along the back surface, within guide channel 120. The top of the offset handle 118 is formed into an inverted hook. When the door is closed arid the slidable member 116 is lowered into a latched position, the grab handle 132 is partially enclosed by the hook-shaped handle while the lower end of the slidable member is contained by the catch in the floor 57 of the cabinet.

Holes or openings 126 and 128 in the downwardly projecting flange of the hook, located below and behind the grab handle 132, can be aligned with a fixed hasp when the door is closed. This hasp, designated by numeral 115, is fixably attached to the top of the cart immediately below and behind grab handle 132. Holes 126' and 128' in the fixed hasp 115 can be aligned with holes in the movable handle hasp 118. The shackle of a padlock can be used to keep the movable handle hasp and the fixed hasp together. This embodiment of the invention offers even greater security than the previous embodiment because the padlock is retained below the grab handle, and, in addition, is shielded by the front of the upper handle of slidable member 116.

Although previous embodiments of the invention herein described utilize hasps with openings for the shackle of a padlock commonly used on airplane service carts, it is clearly anticipated that appropriately chosen special padlocks having shackles of different lengths and widths could be used to join the movable handle hasp and fixed hasp). In some cases, a special padlock could be used to join the movable handle with the grab handle.

A special padlock can also be used to join the movable handle to itself by providing cut-out openings in peripheral edges of the movable handle aligned with cut-out openings in its downwardly projecting flange. In this example, the cut-out openings would accommodate the interior dimension of the shackle of a padlock. With the slidable latch 116 in a lowered position, the shackle can extend from in front of the upper handle 118 under the grab handle 132 to a point behind the downwardly projecting flange of the movable handle. The shackle of the padlock, when locked, closely surrounds the cut-out openings restricting upward vertical movement of the slidable member.

It will be apparent that while the invention has been described and shown in preferred embodiments, changes may be made in the structures shown without departing from the scope of the invention as sought to be defined in the following claims:

I claim:

1. The combination of a service cart provided with a door for use on an airplane and an improved door latching mechanism, said latching mechanism comprising:

a vertically slidable body member, a guide channel incorporated into the door of said cart, said slidable body member being at all times at least partially contained within said guide channel;

said body member being provided with an upper handle portion, receiving means in the floor of said cart, said slidable body member having a lower portion adapted to engage said receiving means when the door of the service cart is closed and said slidable member is in a lowered position.

2. The cart of claim 1 in which the receiving means comprises an opening in the floor of the cart.

3. The cart of claim 1 in which the slidable body member is made from sheet metal.

4. The cart of claim 1 further comprising:

a grab handle attached to the top of the cart above the door in which said upper handle portion has means to engage said grab handle when the door of the service cart is closed and the slidable body member is in a lowered position.

5. The cart of claim 1 further comprising:

a grab handle attached to the top of the cart above the door in which said upper handle portion has an inverted hook shape partially enclosing said grab handle when the door of the service cart is closed and the slidable body member is in a lowered position.

6. The combination of a service cart provided with a door for use on an airplane and an improved door latching mechanism, said latching mechanism comprising:

a vertically slidable body member;

a guide channel incorporated into the door of said cart;

said slidable body member being at least partially contained within said guide channel;

said body member being provided with an upper handle portion;

receiving means comprising an opening in the floor of said cart;

said slidable body member having a lower portion adapted to engage said receiving means when the door of the service cart is closed and said slidable member is in a lowered position;

a grab handle attached to the top of the cart above the door in which said upper handle portion has an inverted hook shape partially enclosing said grab handle when the door of the service cart is closed and the slidable body member is in a lowered position; and said door of the cart is provided with an opening enabling said upper handle portion to pass laterally offset through the door, parallel and forward of the plane of the vertically slidable body member.

7. The combination of a service cart provided with a door for use on an airplane and an improved door latching and locking mechanism, said mechanism including a padlock and comprising:

a vertically slidable body member;

a guide channel incorporated into the door of said cart;

said slidable body member being at all times at least partially contained within said guide channel;

said body member being provided with an upper handle portion;

said upper handle portion having at least one opening for acceptance of the shackle of a padlock;

receiving means in the floor of said cart;

said slidable body member having a lower portion adapted to engage said receiving means when the door of the service cart is closed and said slidable member is in a lowered position;

a hasp attached to the top of the cart positioned above the door, said hasp having at least one opening aligned with the opening in the aforesaid upper handle portion such that the shackle of a padlock connects said upper handle portion to the hasp when the slidable member is in a lowered position.

8. The cart of claim 7 further comprising:

a grab handle attached to the top of the cart above the door in which said upper handle portion has an inverted hook shape partially enclosing said grab handle when the door of the service cart is closed and the slidable body member is in a lowered position.

9. The combination of a service cart provided with a door for use on an airplane and an improved door latching and locking mechanism, said mechanism including a padlock and comprising:

a vertically slidable body member;

a guide channel incorporated into the door of said cart;

said slidable body member being at least partially contained within said guide channel;

said body member being provided with an upper handle portion;

said upper handle portion having at least one opening for acceptance of a padlock;

receiving means in the floor of said cart;

said slidable body member having a lower portion adapted to engage said receiving means when the door of the service cart is closed and said slidable member is in a lowered position;

a hasp attached to the top of the cart positioned above the door, said hasp having at least one opening aligned with the opening in the aforesaid upper handle portion such that the shackle of a padlock connects said upper handle portion to the hasp when the slidable member is in a lowered position;

a grab handle attached to the top of the cart above the door in which said upper handle portion has an inverted hook shape partially enclosing said grab handle when the door of the service cart is closed and the slidable body member is in a lowered position, the opening in said upper handle portion being located behind said grab handle when the slidable member is in a lowered position.

10. The cart of claim 9 further comprising:

said cart door having an opening to permit said upper handle portion to pass laterally offset through the door, parallel and forward of the plane of the vertically slidable body member.

11. The cart of claim 9 further comprising:

said cart door having an opening to permit said upper handle portion to pass laterally offset through the door, parallel and forward of the plane of the vertically slidable body member, and the opening in said handle portion is located behind said grab handle when the slidable member is in a lowered position.

12. The combination of a service cart provided with a door for use on an airplane and an improved door latching arid locking mechanism, said mechanism including a padlock and comprising:

a vertically slidable body member;

a guide channel incorporated into the door of said cart;

said slidable body member being at least partially contained within said guide channel;

said body member being provided with an upper handle portion;

said upper handle portion having at least one opening for acceptance of the shackle of a padlock;

said upper handle portion having at least one flange projecting outward perpendicular to the axis of the slidable member, the aforesaid flange fixably attached to at least one remotely located downwardly projecting member;

the top of said cart having a hole aligned with and capable of receiving the downwardly projecting member;

the door of said cart having a hole aligned with and capable of receiving the downwardly projecting member, such that when the door of the cart is closed the receiving holes are co-linear and said downwardly projecting member penetrates said holes connecting the upper handle to the door when the vertically slidable member is in a lowered position;

receiving means in the floor of said cart;

said slidable body member having a lower portion adapted to engage said receiving means when the door of the service cart is closed and said slidable member is in a lowered position;

a hasp attached to the top of the cart positioned above the door, said hasp having a least one opening aligned with the opening in the aforesaid upper handle portion such that the shackle of a padlock connects said upper handle portion to the hasp when the slidable member is in a lowered position.

13. The cart of claim 12 in which the receiving means comprises an opening in the floor of the cart.

14. The cart of claim 12 in which the body member is made from sheet metal.

15. The cart of claim 12 in which the upper handle portion has a forwardly projecting flange which limits physical access to the juncture of said upper handle portion and said hasp when the handle and hasp are connected by the shackle of a padlock.

* * * * *